United States Patent [19]

McCune

[11] Patent Number: 4,495,494
[45] Date of Patent: Jan. 22, 1985

[54] DETECTOR CIRCUIT FOR COMMUNICATION LINES

[75] Inventor: Robert F. McCune, Sandwich, Ill.

[73] Assignee: Bell Telephone Laboratories, Incorporated, Murray Hill, N.J.

[21] Appl. No.: 308,911

[22] Filed: Oct. 5, 1981

[51] Int. Cl.³ .............................................. H04M 3/22
[52] U.S. Cl. ..................... 340/825.06; 179/18 AH; 179/18 FA
[58] Field of Search ....... 179/18 AH, 18 FA, 16 AA, 179/16 F; 340/825.06, 825.17, 825.09

[56] References Cited

U.S. PATENT DOCUMENTS

| | | | |
|---|---|---|---|
| 3,819,866 | 6/1974 | Hawley | 179/16 AA |
| 4,079,208 | 3/1978 | Rogers et al. | 179/18 FA |
| 4,099,032 | 7/1978 | Roge et al. | 179/18 FA |
| 4,254,305 | 3/1981 | Treiber | 179/16 F |
| 4,282,407 | 8/1981 | Stiefel | 179/18 FA |
| 4,282,408 | 8/1981 | Stauers | 179/18 FA |
| 4,289,933 | 9/1981 | Henry | 179/18 FA |

FOREIGN PATENT DOCUMENTS 1561392  2/1980  United Kingdom ........... 179/18 FA

*Primary Examiner*—Thomas W. Brown
*Attorney, Agent, or Firm*—R. J. Godlewski; P. Visserman

[57] ABSTRACT

A detector circuit detects one of two impedances presented by a communication line for each one of a plurality of operative modes. The circuit comprises a network having three parallel branches. The first includes two serially connected resistors which develop a reference potential in response to current flowing in the line. The second branch includes two oppositely poled light-emitting diodes (LEDs) which form a sensor to detect current flow in the line in either direction. The third branch includes a varistor to limit the magnitude of unexpected potentials applied to the sensor. When the magnitude of the reference potential is sufficient to forward bias either LED and the magnitude of the current is greater than a predetermined level, one of the LEDs will generate an output signal representative of one impedance of the line. Otherwise, the LEDs generate a second output representative of the other impedance of the line in a particular operative mode. In addition, a switch selectively controls the amount of current applied to the sensors by reconfiguring the network. In such instances, both of the resistors are directly connected to a source of potential with one resistor acting as a current limiter.

10 Claims, 3 Drawing Figures

DETECTOR CIRCUIT FOR COMMUNICATION LINES

TECHNICAL FIELD

The invention relates generally to communication line interface circuits for use in a switching office and, more particularly, to a detector circuit for detecting the impedance of a communication line having a plurality of operative modes and a plurality of impedances for each of the modes.

BACKGROUND OF THE INVENTION

In telephone systems, trunk circuits serve as an interface between communication or, more particularly, transmission lines connected to a distant switching office and the switching network of a local telephone switching office. The establishing of a transmission path between adjacent offices is usually preceded by certain signaling between the offices. Commonly, the lines are designed to assume one of two impedances for the purpose of such signaling. Generally, a trunk circuit includes a power supplying circuit and a signaling detector circuit to detect the high and low impedances of the line.

Since the current in a line is a function of the impedance of the line, the two impedances may be detected by any one of a number of well-known current detectors such as, for example, relays and the like. Characteristically, these current detectors have one threshold level against which current applied to the detector is compared. Current above the threshold level causes the detector to generate an output signal indicative of one impedance of the line. Current below the threshold level causes the detector to generate another output signal indicative of the second impedance of the line. Thus, it is common practice to select a current detector having a threshold level somewhere in between the two current levels which are a function of the two impedances of the line.

However, with more complicated signaling schemes, communication lines are often designed to assume one of three, four, or more impedances, different pairs of impedances from the plurality commonly being utilized for each operative mode of the line. In the prior art, relays and the like are switched in and out of the line to detect two current levels for each operative mode of the line. Since these detector circuits are costly and usually bulky, it would be desirable to have one detector circuit that could detect the different pairs of impedances presented by the line for each operative mode.

SUMMARY OF THE INVENTION

A detector circuit in accordance with this invention detects the impedance of a communication line, which has a plurality of operative modes and has first and second impedances for each of the operative modes. The detector circuit comprises means for developing a reference potential in response to current flowing in the line. Responsive to the current in the line and the reference potential, a sensor generates a first output signal representative of the first impedance when the magnitude of the current in the line and the reference potential is greater than a first and a second threshold level, respectively. Otherwise, the sensor generates an output signal representative of the second impedance level. In addition, a current limiter, which is selectively controlled by a switch, limits the current applied to the sensor for particular operative modes of the line.

In one illustrative embodiment of the invention, the detector circuit comprises a network having three parallel branches connected to the line. The first branch includes two serially connected resistors which develop a reference potential in response to current flowing in the line. The second branch includes two oppositely poled light-emitting diodes (LEDs) which forms a sensor to detect the flow of current in the line in either direction. The third branch includes a varistor for limiting the magnitude of the potential applied to the sensor. When the magnitude of the reference potential is sufficient to forward bias one of the light-emitting diodes and the magnitude of the current applied to the LEDs is greater than a predetermined threshold level, one of the LEDs will generate a first output signal representative of the first impedance of the line. When either the reference potential is insufficient to forward bias one of the LEDs or the current in the line applied to the LEDs is below the predetermined threshold level, the LEDs generate a second output signal representative of the second impedance. The detector circuit also includes a switch for selectively connecting the network to either a source of potential or ground, thereby selectively controlling the amount of current applied to the LEDs. In one operative mode, to complete the current path, the switch includes a pair of break contacts which connect the three branches of the network to ground. In another operative mode, the switch includes a pair of make contacts which directly connect both of the serially connected resistors to a source of potential. In this operative mode, one of the resistors is now configured to limit the current through the LEDs.

Advantageously, in accordance with this invention, the first and second impedances for each operative mode of a communication line can be detected with a single detector circuit.

BRIEF DESCRIPTION OF THE DRAWING

The invention may be better understood from the following detailed description when read with reference to the drawing in which.

DETAILED DESCRIPTION

Figure 1:
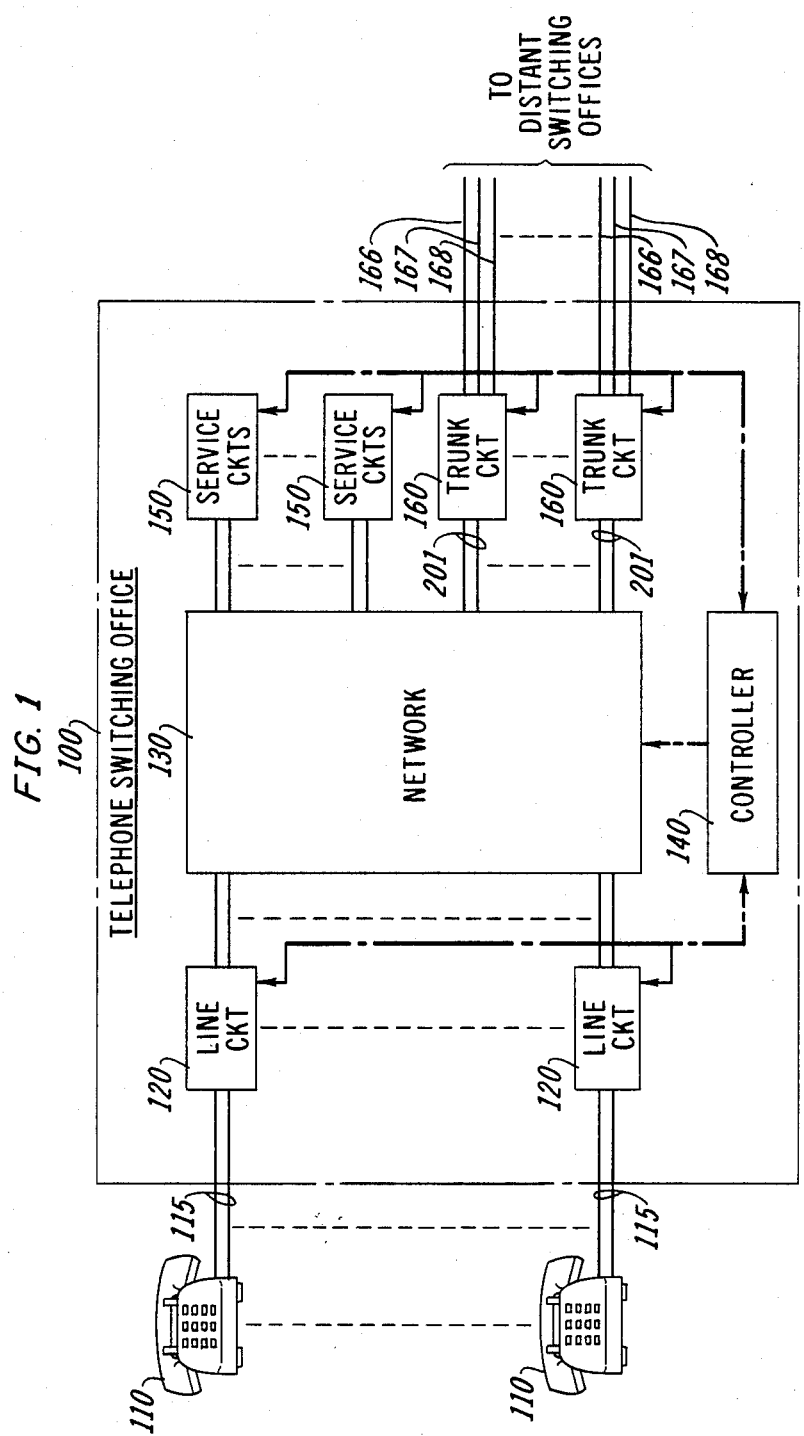
FIG. 1 is a representation of a telephone communication system in general block diagram form.

In an illustrative embodiment of this invention as depicted in the drawing and described herein, a plurality of telephone subscriber sets 110 are connected to telephone switching office 100 by means of communication lines, or more particularly, subscriber lines 115. Telephone switching office 100 may also be connected to one or more distant switching offices by means of communication or, more particularly, transmission lines 166, 167, and 168. By way of illustration, a switching office may comprise a switching network 130, a plurality of line circuits 120, service circuits 150, trunk circuits 160, as well as a controller 140. As is customary, line circuits 120 provide an interface between subscriber lines 115 and switching network 130. Service circuits 150 generally include such circuits as signal pulse receivers, tone circuits, etc. Trunk circuits provide an interface with the switching network and transmission lines 166, 167, and 168. The controller senses the operational state and activities of the line, service, and trunk circuits to detect certain signaling information, controls the network to establish connections between the various circuits, and manages the state of the circuits as required.

Figure 2:
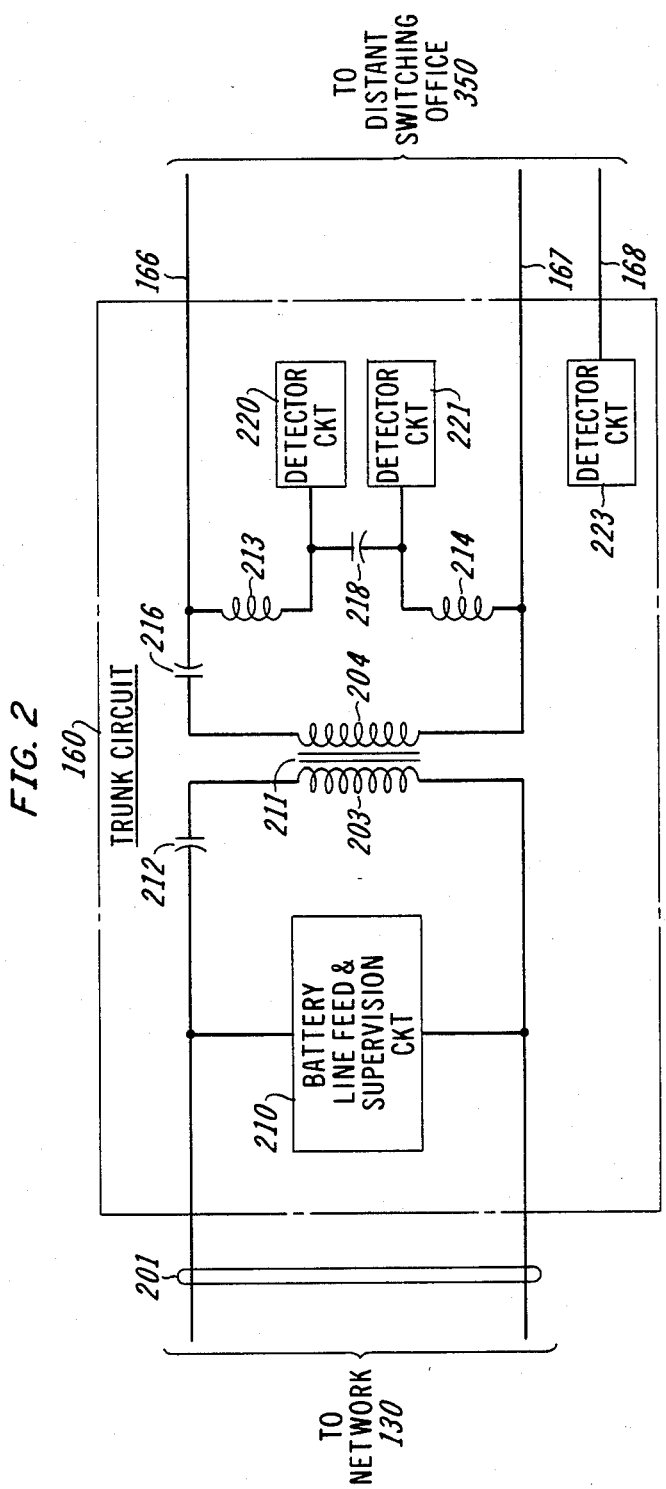
FIG. 2 shows a trunk circuit for use system in a telephone communication in accordance with the invention.

The details of trunk circuit 160 are depicted in FIG. 2. The network side of trunk circuit 160 is connected to network 130 through network leads 201, and the transmission side is connected to transmission lines 166, 167, and 168. Network leads 201 and transmission lines 166 and 167 are magnetically coupled and electrically isolated by transformer 211. Transformer 211 passes voice signals between network leads 201 and transmission lines 166 and 167, but prevents any DC signals to pass. Primary winding 203 of the transformer is connected across network leads 201 through DC blocking capacitor 212, isolating the transformer from battery line feed and supervision circuit 201; secondary winding 204 is connected across transmission lines 166 and 167 via DC blocking capacitor 216, isolating the transformer from any DC current that may be flowing in transmission lines 166 and 167.

On the network side of the trunk circuit is a well-known battery line feed and supervision circuit 210 which is connected across network leads 201. When the trunk circuit is connected to subscriber line 115 through the network in a well-known manner, circuit 210 supplies battery to the subscriber line and supervises its status, reporting the on-hook and off-hook states of subscriber set 110 to the switching system. In addition, the power supplied from circuit 210 may be electrically isolated from ground to reduce power consumption and minimize longitudinal currents. Longitudinal currents are frequently induced in communication lines by electrical power lines which are physically located in the vicinity.

On the transmission side of the trunk circuit are detector circuits 220 and 221 which detect the impedances of transmission lines 166 and 167, respectively. Also included are inductors 213 and 214, which, along with capacitor 218, help prevent voice signal loss on transmission lines 166 and 167. Detector circuits 220 and 221 are interconnected by capacitor 218 and are connected to transmission lines 166 and 167 through inductors 213 and 214, respectively. Detector circuit 221 may be any well-known current detector such as, for example, an opto-isolator and the like, which detects current above and below a given threshold level.

At this point, there are two types of transmission lines that should be mentioned, those that have one or more operative modes and present the same two impedances for each mode and those that have two or more operative modes and present a different pair of impedances for desired modes. With the first type, the two impedances of the line may be detected by a single detector circuit. With the second type, a different detector is usually employed to detect each different pair of impedances presented by the line. However, detector circuit 220 detects different pairs of impedances presented for particular operative modes of the line.

Normally, only two conductors, transmission lines 166 and 167, are required to implement most signaling schemes which control the operative modes of the line. However, in more complicated signaling schemes, a third conductor, transmission line 168, may be required. This line is useful when more signals are required than are supplied on transmission lines 166 and 167. Connected to transmission line 168 is detector circuit 223. Like detector circuit 221, detector circuit 223 may be any well-known current detector that detects current above a given threshold level.

Figure 3:
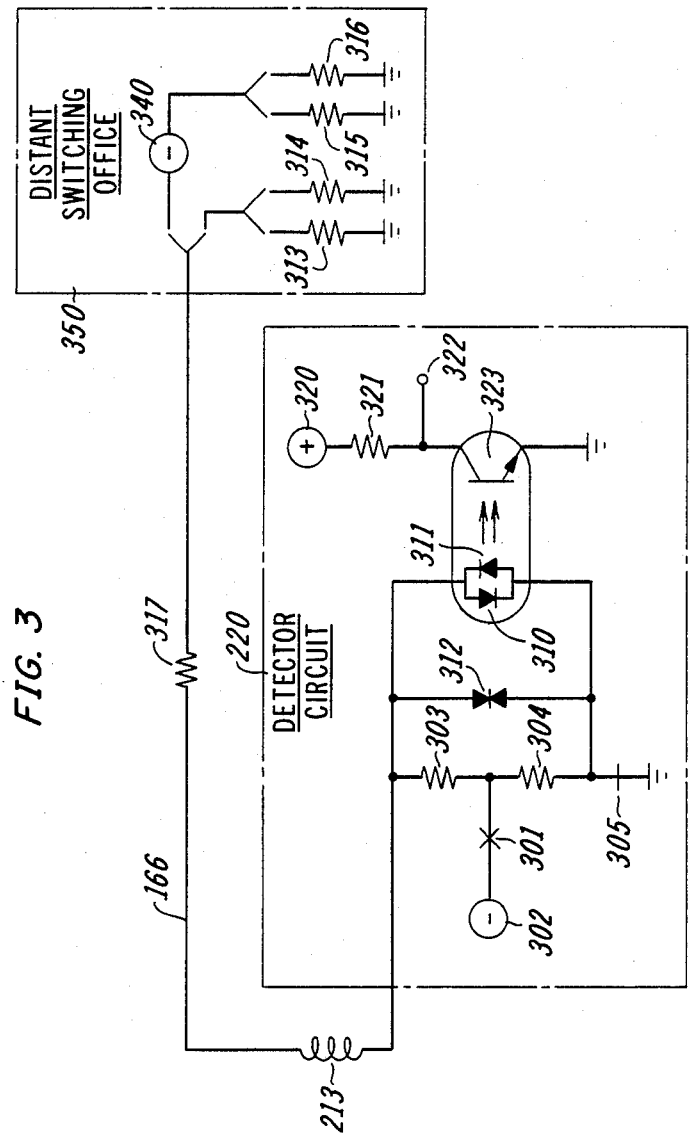
FIG. 3 shows in greater detail the detector circuit for use with a trunk circuit, which is connected to a distant switching office, in accordance with one specific embodiment of the invention.

The details of detector circuit 220 are depicted in FIG. 3 and are described next. Detector circuit 220 detects the impedance of transmission line 166 and is connected to the local end of the line via inductor 213. The distant end of the line is connected to distant switching office 350. Distant switching office 350 may terminate the line with different types of apparatus such as, for example, signal receivers and transmitters, as determined by the operative mode of the line. This apparatus may terminate the line with a plurality of impedances depicted in the drawing by resistors 313–316, which connect the distant end of transmission line 166 to ground either directly or through a source of potential. Since transmission line 166 has an impedance depicted in the drawing by resistor 317, the total impedance presented to the detector circuit will be the combined impedances of inductor 213, the impedance of the line, and the impedance of the apparatus terminating the line at the distant switching office.

Transmission line 166 has two operative modes. In the first mode, the distant end of the line is selectively connected to one of two impedances, resistor 315 or 316, through negative potential source 340. In the second mode, the distant end of the line is selectively connected to one of two different impedances, resistors 313 and 314. Thus, in the first mode, the total impedance presented to the detector circuit is the combined impedance of inductor 213, the line, and either resistor 315 or 316. When resistor 315 is connected, a first impedance of, for example, something less than 22,000 ohms may be presented to the detector circuit, and when resistor 316 is connected, a second impedance of something greater than 27,000 ohms. In the second mode the total impedance presented to the detector circuit is the combined impedance of inductor 213, the line, and either resistor 313 or 314. With resistor 313 connected, this combination may present a first impedance of, for example, less than 2500 ohms, and with resistor 314 connected, a second impedance of something greater than 7500 ohms.

Detector 220 comprises a network having three parallel branches connected to transmission line 166 through inductor 213. In the first operative mode, the first branch includes two serially connected resistors 303 and 304 which develop a reference potential in response to current flowing in the line. In the second mode, only resistor 303 develops the reference potential. Resistor 304 acts as a limiter, limiting the current flowing through the other two branches. The second branch of the network includes two oppositely poled light-emitting diodes (LEDs) 310 and 311 which form a sensor to detect the flow of current in the line in either direction. The third branch of the network includes varistor 312 for limiting the magnitude of the potential applied to LEDs 310 and 311 from unexpected voltage surges caused by, for example, lightning.

In addition, a switch connected to the network selectively controls the amount of current applied to the sensor. The switch comprises two pairs of relay contacts 301 and 305, which selectively connect the network to either ground or a source of potential. Although not shown, "make" and "break" contact pairs 301 and 305 are part of any well-known relay which will close and open contact pairs 301 and 305, respectively, in response to a control signal, i.e., from controller 140.

In the first operative mode, "break" relay contact pair 305, connects the three branches of the network to ground, and distant switching office 350 selectively connects the distant end of transmission line 166 to either resistor 315 or 316 through negative source of potential 340. In this mode, a current path is established which includes contacts 305; resistors 303 and 304 as well as LED 311; inductor 213; line impedance 317; negative potential source 340; and either resistor 315 or 316. When resistor 315 is selectively connected to the line, the first impedance presented to the detector circuit is low enough to cause a sufficient amount of current to flow through resistors 303 and 304, to forward bias LED 311. With LED 311 forward biased, there is also enough current to cause LED 311 to generate an optical output signal to phototransistor 323. The collector of phototransistor 323 is connected to positive potential source 320 through current limiting resistor 321 and to detector output terminal 322, the emitter being connected to ground. Receiving the optical output signal, phototransistor 323 conducts current. As a result, a first output signal on detector output terminal 322 assumes a low logic level representing the first impedance presented to the detector circuit.

In the same operative mode with resistor 316 selectively connected to the distant end of the line, a second impedance, higher than the first, is presented to detector circuit 220. With a higher impedance presented to detector circuit 220, the current flow through the network and transmission line will be less than that associated with the first impedance. With less current flowing through the network, the voltage developed across resistors 303 and 304 is insufficient to forward bias LEDs 310 and 311. Hence, current does not flow through the LEDs, and no optical signal is presented to phototransistor 323. With no optical signal presented, phototransistor 323 does not conduct current. As a result, a second output signal on detector output terminal 322 assumes a high logic level which represents the second impedance presented to detector circuit 220. The two detector output signals may then be used to drive any one of a number of well-known scanning devices for signaling the presence of the first and second impedances of the line in the first operative mode to controller 140.

In the second operative mode, relay contact pairs 301 and 305 are operated, and distant switching office 350 selectively terminates transmission line 166 with either resistor 313 or 314. Thus, two impedances, different from the two impedances presented in the first mode, are now presented to detector circuit 220. In the second mode, the switch connects the network to a source of potential and limits the amount of current applied to the LEDs by directly connecting both resistors 303 and 304 to negative potential source 302 through "make" contact pair 301. In this case, negative potential source 302 causes current to flow in the opposite direction from the way it flows when negative potential source 340 is connected to the line at the distant switching office. With resistor 313 selectively connected to the line, a current path is established with current flowing through the line and the detector circuit. Current flows through resistor 303, developing a reference potential which is applied across now serially connected resistor 304 and LEDs 310 and 311. This potential is sufficient to forward bias LED 310. Current now flows through LED 310 and resistor 304 to negative potential source 302. This current is sufficient to cause LED 310 to present an optical signal to phototransistor 323. This optical output signal causes phototransistor 323 to conduct current and detector output terminal 322 to assume a low logic level as described in the first operative mode. Thus, a first output signal present on output terminal 322 represents the first impedance presented to detector circuit 220 with resistor 313 selectively connected to the line at distant switching office 350.

When distant switching office 350 selectively connects resistor 314 to the transmission line 166, a second impedance, larger than the first, is presented to detector circuit 220. With a larger impedance applied, the current through resistor 303 is insufficient to forward bias either LED 310 or 311, and no optical signal is presented to phototransistor 323. As a result, a second output signal on output terminal 322 assumes a high logic level which represents the second impedance presented to the detector circuit.

Although detector circuit 220 was described with relay contact pairs 301 and 305 selectively connecting resistors 303 and 304 to negative potential source 302 or the three branches of the network to ground, there are several other configurations that need be mentioned. In the first mode, resistor 304 was connected to ground through relay contact pair 305. However, both resistors 303 and 304 may be directly connected to ground through relay contact pair 301. In this configuration, resistor 304 will limit the current flowing through LED 310 or 311. Thus, a higher level of current could be detected by detector circuit 220 with the distant switching office 350 applying a source potential to the transmission line.

In the second operative mode, instead of connecting negative potential source 302 to resistors 303 and 304, negative potential source 302 may be directly connected to the three branches of the network. In this configuration, resistor 304 will not limit the current flowing through LED 310, and the reference potential applied to the LEDs would be developed across both resistors 303 and 304. Thus, two larger impedances may be detected by detector circuit 220.

It is to be understood that the above described arrangement is merely an illustrative application of the principles of the invention and that numerous other arrangements may be devised by those skilled in the art without departing from the spirit and scope of the invention. It is also to be understood that the detector circuit may be utilized with transmission lines that are electrically isolated from ground. In this arrangement, the power supplied to the transmission line would have to be electrically isolated from ground and a return path to the distant switching office substituted for the ground connection of the detector circuit. Since an opto-isolator comprising LEDs 310, 311, and phototransistor 323 were utilized, the electrical signals developed through the network are electrically isolated from the output terminals present on output terminal 322.

What is claimed is:

1. A detector circuit for use in a communication line having a plurality of operative modes and having first and second resistances for each of said modes; said circuit comprising:

resistance means connected only serially to said line and responsive to current in said line for developing a reference potential;

sensor means connected only serially to said line and responsive to said current and said reference potential for generating a first output signal representative of said first resistance when the magnitude of said current and said reference potential are both greater than a first and a second threshold level, respectively, and a second output signal representative of said second resistance when the magnitude of either said current or said reference potential is less than said first and said second threshold level, respectively;

current limiter means connected only serially to said line for limiting said current applied to said sensor means; and switch means for selectively controlling said current limiter means for particular ones of said plurality of operative modes.

2. A detector circuit in accordance with claim 1 in which said circuit further comprises voltage limiter means responsive to said reference potential for limiting the magnitude of said reference potential applied to said sensor means.

3. A detector circuit in accordance with claim 1 or 2 in which said switch means comprises a first pair of contacts operative to selectively connect and disconnect said current limiter means and said sensor means to ground.

4. A detector circuit in accordance with claim 3 in which said switch means further comprises a second pair of contacts operative to selectively connect and disconnect said current limiter means and said resistance means to a source of potential.

5. A detector circuit in accordance with claim 4 in which said sensor means comprises a first light-emitting device for sensing said current flowing in one direction in said line and a photodetector optically coupled to said first light-emitting device for generating said output signals.

6. A detector circuit in accordance with claim 5 in which said sensor means further comprises a second light-emitting device optically coupled to said semiconductor device for sensing said current flowing in the opposite direction in said line.

7. A detector circuit for use in a communication line having a plurality of operative modes and having first and second resistances for each of said modes; said circuit comprising:

a network connected only serially to said line and having a first branch having a pair of serially connected resistors and a second branch parallel to said first branch and having a pair of oppositely poled light-emitting devices; and switch means for selectively controlling current applied to said network for particular ones of said plurality of operative modes.

8. A detector circuit in accordance with claim 7 in which said network further comprises a third branch, parallel to said first and second branches and having a varistor.

9. A detection circuit in accordance with claim 7 or 8 in which said switch means comprises a first pair of contacts to selectively connect and disconnect all of said branches to ground.

10. A detector circuit in accordance with claim 9 in which said switch means further comprises a second pair of contacts to selectively disconnect and connect both of said serially connected resistors to a source of potential.

* * * * *